(12) United States Patent
Saito et al.

(10) Patent No.: US 9,894,784 B2
(45) Date of Patent: Feb. 13, 2018

(54) DISPLAY APPARATUS

(71) Applicant: JOLED INC., Tokyo (JP)

(72) Inventors: Akihiko Saito, Tokyo (JP); Yoshihiro Taniguchi, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 14/915,949

(22) PCT Filed: Apr. 16, 2014

(86) PCT No.: PCT/JP2014/002167
§ 371 (c)(1),
(2) Date: Mar. 2, 2016

(87) PCT Pub. No.: WO2015/033489
PCT Pub. Date: Mar. 12, 2015

(65) Prior Publication Data
US 2016/0219726 A1    Jul. 28, 2016

(30) Foreign Application Priority Data

Sep. 9, 2013  (JP) ................................ 2013-186273

(51) Int. Cl.
| H05K 5/02 | (2006.01) |
| H04N 5/64 | (2006.01) |
| H05K 5/00 | (2006.01) |

(52) U.S. Cl.
CPC .................. *H05K 5/02* (2013.01); *H04N 5/64* (2013.01); *H05K 5/0017* (2013.01)

(58) Field of Classification Search
CPC ...... H05K 5/02; H05K 5/0213; H05K 5/0239; H05K 5/0017
See application file for complete search history.

(56) References Cited

U.S. PATENT DOCUMENTS

| 6,104,451 | A | * | 8/2000 | Matsuoka ......... G02F 1/133308 349/58 |
| 9,661,764 | B2 | * | 5/2017 | Jung .................... H05K 5/0017 |
| 9,711,752 | B2 | * | 7/2017 | Lee ..................... H01L 51/5237 |

(Continued)

FOREIGN PATENT DOCUMENTS

| JP | 2000-137446 | 5/2000 |
| JP | 2005-208278 | 8/2005 |

(Continued)

OTHER PUBLICATIONS

Office Action from Japan Patent Office (JPO) in Japanese Patent Appl. No. 2015-535285, dated Aug. 8, 2017.
International Search Report (ISR) from International Searching Authority (Japan Patent Office) in International Pat. Appl. No. PCT/JP2014/002167, dated Jul. 22, 2014.

*Primary Examiner* — Hoa C Nguyen
*Assistant Examiner* — Christopher L Augustin
(74) *Attorney, Agent, or Firm* — Greenblum & Bernstein, P.L.C.

(57) ABSTRACT

A display apparatus including: a display panel; and a chassis structure which holds the display panel, wherein the chassis structure includes a first chassis member in which a recess whose opening opens toward a display panel side is formed, and a second chassis member which is in a plate shape, and mounted on the first chassis member, covering at least a portion of the opening of the recess.

15 Claims, 11 Drawing Sheets

(56) References Cited

U.S. PATENT DOCUMENTS

| | | | |
|---|---|---|---|
| 2005/0019082 A1* | 1/2005 | Silverbrook | B41J 2/01 400/693 |
| 2005/0184631 A1 | 8/2005 | Kim | |
| 2006/0082272 A1 | 4/2006 | Kim et al. | |
| 2006/0087210 A1* | 4/2006 | Kim | H05K 5/0213 313/24 |
| 2009/0316371 A1 | 12/2009 | Kim et al. | |
| 2010/0182262 A1* | 7/2010 | Yoshikawa | G06F 1/1601 345/173 |
| 2010/0231108 A1* | 9/2010 | Azami | H05K 5/02 312/352 |
| 2011/0063532 A1* | 3/2011 | Nakase | H04N 5/64 348/843 |
| 2013/0100356 A1* | 4/2013 | Suzuki | H05K 5/02 348/725 |
| 2014/0015817 A1* | 1/2014 | Nakao | G06F 1/1601 345/205 |
| 2014/0022754 A1 | 1/2014 | Momose et al. | |

FOREIGN PATENT DOCUMENTS

| | | |
|---|---|---|
| JP | 2006-091895 | 4/2006 |
| JP | 2008-003315 | 1/2008 |
| JP | 2010-002902 | 1/2010 |
| JP | 2011-160384 | 8/2011 |
| JP | 2012-053082 | 3/2012 |
| JP | 2014-021224 | 2/2014 |

* cited by examiner

DISPLAY APPARATUS

TECHNICAL FIELD

The present disclosure relates to a display apparatus which includes a display panel.

BACKGROUND ART

In display apparatuses which include a thin display panel, such as liquid crystal display apparatuses and organic electro luminescent (EL) display apparatuses, a chassis made of metal is placed on the rear side of the display panel to provide display panel rigidity.

If provision of display panel rigidity by a flat chassis is difficult, it is known to augment the strength of the chassis by carrying out a drawing process on the chassis (see Patent Literature (PTL) 1).

CITATION LIST

Patent Literature

[PTL 1] Japanese Unexamined Patent Application Publication No. 2012-53082

SUMMARY OF INVENTION

Technical Problem

In recent: years, as display panels are becoming larger, it is required to provide additional display panel rigidity. In this case, it is contemplated to increase the depth of the chassis by the drawing process. However, increasing the depth of the chassis by a drawing process is not preferable because there is also a desire for a reduction in thickness of the entire display apparatus.

The present disclosure is made in view of such a problem and has an object to provide a display apparatus which includes a chassis structure having a desired strength.

Solution to Problem

To address the above problem, the display apparatus includes: a display panel; and a chassis structure which holds the display panel, wherein the chassis structure includes a first chassis member in which a recess whose opening opens toward a display panel side is formed, and a second chassis member which is in a plate shape, and mounted on the first chassis member, covering at least a portion of the opening of the recess.

Advantageous Effects of Invention

Since the chassis structure has a desired strength, desired display panel rigidity can be provided even if the chassis structure is a thin chassis structure. This allows a thin display panel having excellent rigidity to be implemented. Further, this can also enhance heat dissipation capability of the display panel.

DESCRIPTION OF EMBODIMENTS

Hereinafter, embodiments according to the present disclosure are to be described, with reference to the accompanying drawings. The embodiments described below are each merely illustration of the present disclosure. Thus, values, shapes, materials, components, and arrangement and connection between the components shown in the following embodiments are merely illustrative and not intended to limit the present disclosure. Therefore, among the components in the embodiments below, components not recited in any one of the independent claims indicating the top level concept of the present disclosure are described as arbitrary components.

Figures are schematic views and do not necessarily illustrate the present disclosure precisely. In the figures, the same reference signs are used to refer to substantially the same configuration, and thus duplicate description is omitted or simplified.

Embodiment 1

Figure 1:
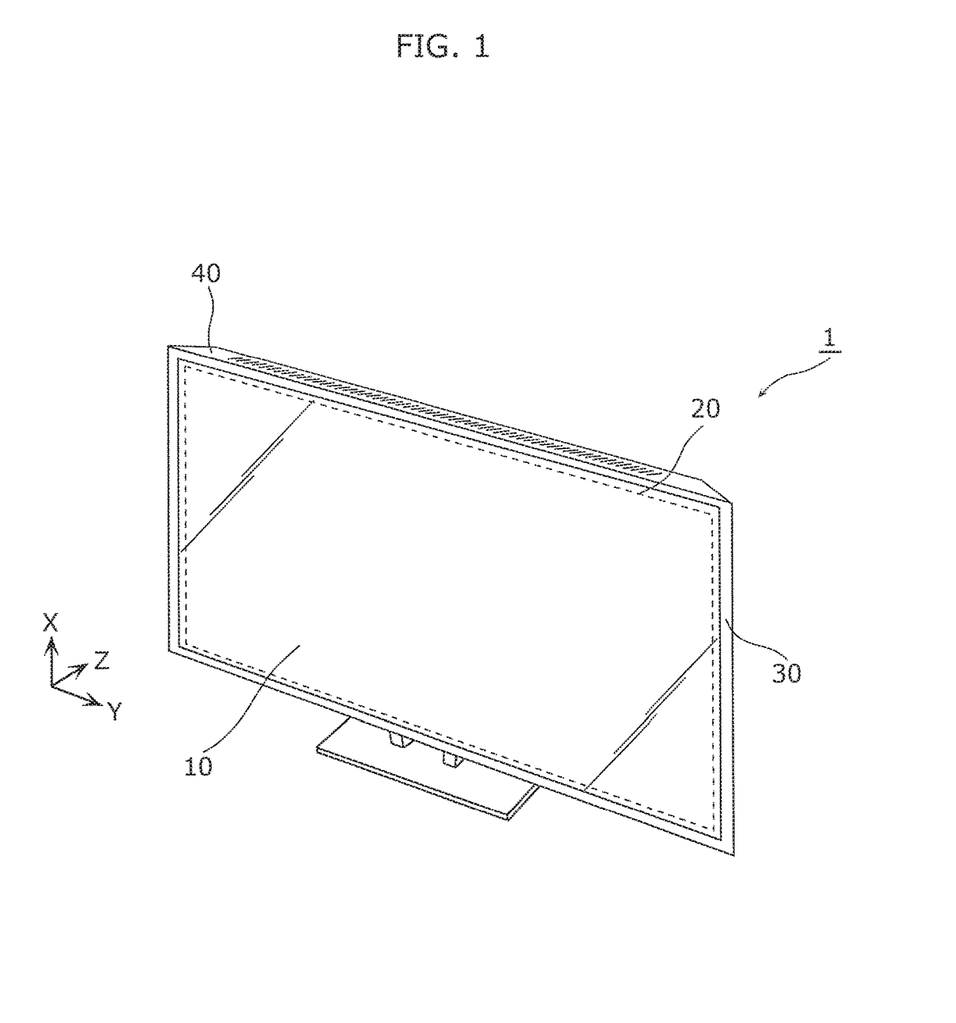
FIG. 1 is an external perspective view of a display apparatus according to Embodiment 1.
Figure 2:
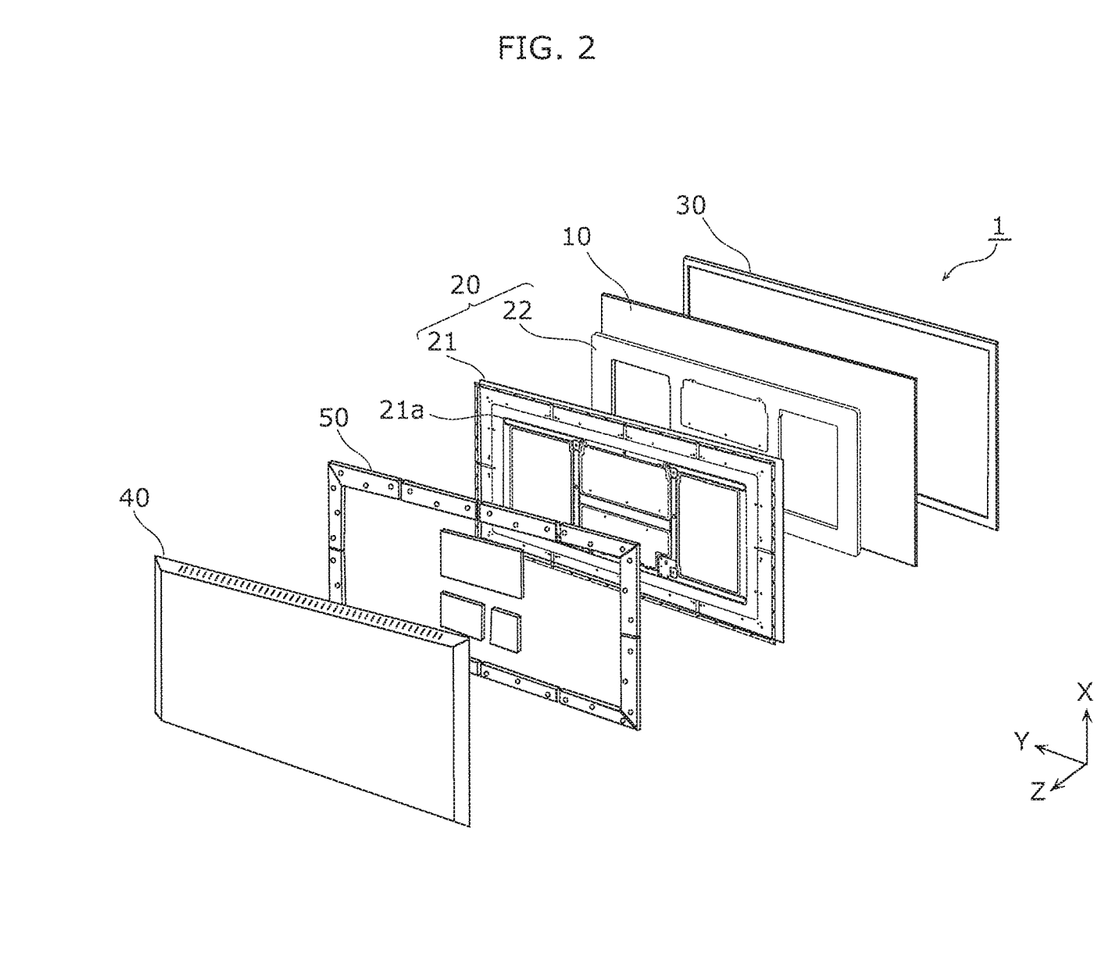
FIG. 2 is an exploded perspective view of the display apparatus according to Embodiment 1.

First, a configuration of a display apparatus 1 according to Embodiment 1 is described with reference to FIGS. 1 and 2. FIG. 1 is an external perspective view of the display apparatus 1 according to Embodiment 1. FIG. 2 is an exploded perspective view of the display apparatus 1 according to Embodiment 1.

As shown in FIGS. 1 and 2, the display apparatus 1 according to the present embodiment includes a display panel 10 for displaying an image, and a chassis structure 20 for holding the display panel 10.

The display apparatus 1 further includes a frame (a frame structure) 30 which is in a rectangular frame shape and covers the periphery of the surface of the display side of the display panel 10, and a rear cover (a rear housing) 40 which covers the entire chassis structure 20. The frame 30 and the rear cover 40 are formed using, for example, a resin material or a metallic material.

The display apparatus 1 has a structure in which the display panel 10 and the chassis structure 20 are disposed in such a manner between the frame 30 and the rear cover 40. Examples of such a display apparatus 1 include a television transceiver which receives a broadcast wave or the like and outputs a video signal and an audio signal obtained from the broadcast wave or the like.

The display panel 10 is, for example, an organic electro luminescent (EL) panel, and has a thickness of about 1 mm to about 3 mm, for example. It should be noted that the display panel 10 is not limited to organic EL panels, and may be any other flat panel display device, such as an inorganic EL panel, a plasma display panel, or a liquid crystal display panel.

The display panel 10 is mounted on the front surface of the chassis structure 20. As shown in FIG. 2, on the rear surface of the chassis structure 20, a plurality of circuit boards 50 are mounted. The circuit board 50 is a printed circuit board (PCB) on which a plurality of circuit components are mounted. For example, the circuit board 50 is a driver circuit board on which a drive circuit (a driver) or the like which supplies the display panel 10 with a signal voltage is disposed. The circuit boards 50 are disposed along the periphery of the chassis structure 20, and connected to the display panel 10 via a flexible cable. On the flexible cable, for example, a driver IC may be mounted. It should be noted that the circuit boards include power supply circuit boards disposed at the center of the chassis structure 20.

For example, the chassis structure 20 is rigid and made of metal, and includes two members which are a first chassis member 21 having a recess 21a and a second chassis member 22 which is in a plate shape.

The first chassis member 21 is a chassis body which is formed to have the recess 21a by carrying out press working, such as a drawing process or the like, on a rectangular plate member (a metal plate) made of metal such as aluminum or iron, for example. The recess 21a whose opening opens toward the display panel 10 side is formed in the first chassis member 21 by the press working. For example, the recess 21a whose opening opens toward the display panel 10 side is formed by the drawing process on an aluminum plate having a thickness of 0.6 mm. Forming the recess 21a (draw) as such can provide reinforcement of the first chassis member 21, thereby increasing rigidity of the first chassis member 21.

The second chassis member 22 is formed by, for example, processing a plate member (a metal plate) made of metal, such as aluminum and iron, into a predetermined shape. The second chassis member 22 is mounted on the first chassis member 21, covering at least a portion of the opening of the recess 21a of the first chassis member 21. In other words, the second chassis member 22 is mounted on the first chassis member 21, across the opening of the recess 21a of the first chassis member 21. The second chassis member 22 according to the present embodiment is an aluminum plate having a thickness of 0.6 mm, and formed in a predetermined shape to cover the entire opening of the recess 21a of the first chassis member 21.

The second chassis member 22 is placed on the first chassis member 21 in a manner that a surface of the second chassis member 22 is facing the rear surface of the display panel 10.

Figure 3:
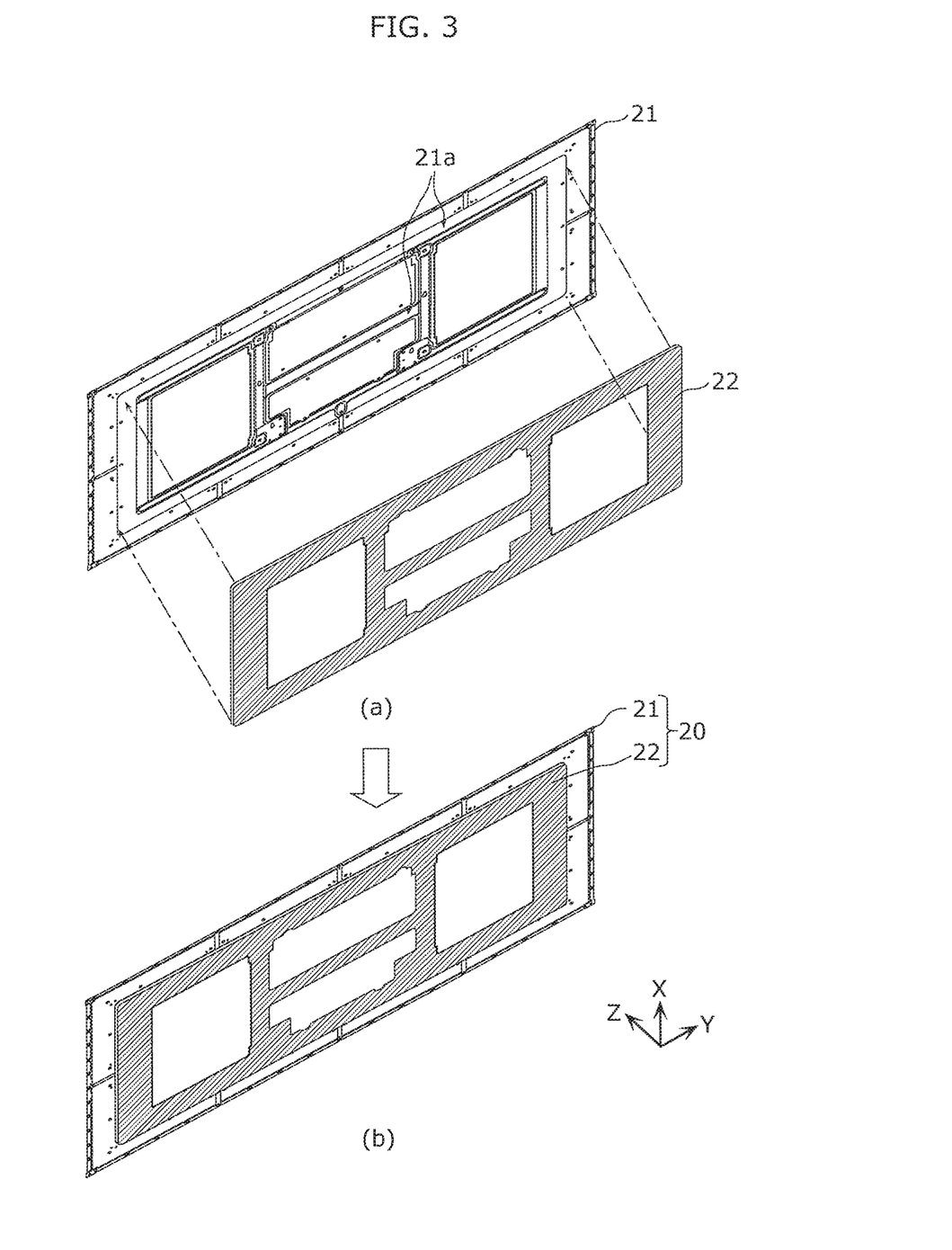
FIG. 3 is a diagram showing a manner in which a chassis structure according to Embodiment 1 is assembled, illustrating in (a) a state prior to joining a first chassis member and a second chassis member, and in (b) a state when the first chassis member and the second chassis member are joined together.

Specifically, the first chassis member 21 and the second chassis member 22 are joined together as shown in (a) and (b) of FIG. 3. FIG. 3 is a diagram showing a manner of assembly of the chassis structure 20 according to Embodiment 1, illustrating in (a) a state prior to joining the first chassis member and the second chassis member, and in (b) a state in which the first chassis member and the second chassis member are joined together. It should be note that the second chassis member 22 is hatched for clarity in FIG. 3.

As shown in (a) and (b) of FIG. 3, the second chassis member 22 is placed on the first chassis member 21, covering the opening of the recess 21a of the first chassis member 21, and the second chassis member 22 and the first chassis member 21 are joined together by, for example, staking. This integrates the first chassis member 21 and the second chassis member 22, and the chassis structure 20 is obtained.

It should be noted that the first chassis member 21 and the second chassis member 22 may be joined together by any other joining method such as spot welding or threads, rather than by staking.

Placing the second chassis member 22 in such a manner, covering the opening of the recess 21a of the first chassis member 21, can reinforce the first chassis member 21. This allows the chassis structure 20 that has a strength required to hold the display panel 10 to be obtained while using a thin material for the first chassis member 21, even in the case where the first chassis member 21 is formed thin (the length in the depth direction is short) for the reason that the depth of the recess 21a of the first: chassis member 21 is not allowed to be increased, for example. Thus, the chassis structure 20 has desired rigidity which can hold the display panel 10 even in the case where the chassis structure 20 has a thin structure in which the first chassis member 21, having the recess 21a formed therein, has a short length in the depth direction.

Furthermore, by covering the recess 21a of the first chassis member 21 with the second chassis member 22, which is the plate member, the surface of the display panel 10 side of the chassis structure 20 can be approximated to a planar surface, as compared to the case without the second chassis member 22. This allows heat generated by the display panel 10 to be efficiently absorbed into the chassis structure 20, thereby increasing heat dissipation capability of the display panel 10 as well.

Here, detailed configuration of the chassis structure 20 is described with reference to FIGS. 4 through 6, and 7A through 7C.

Figure 4:
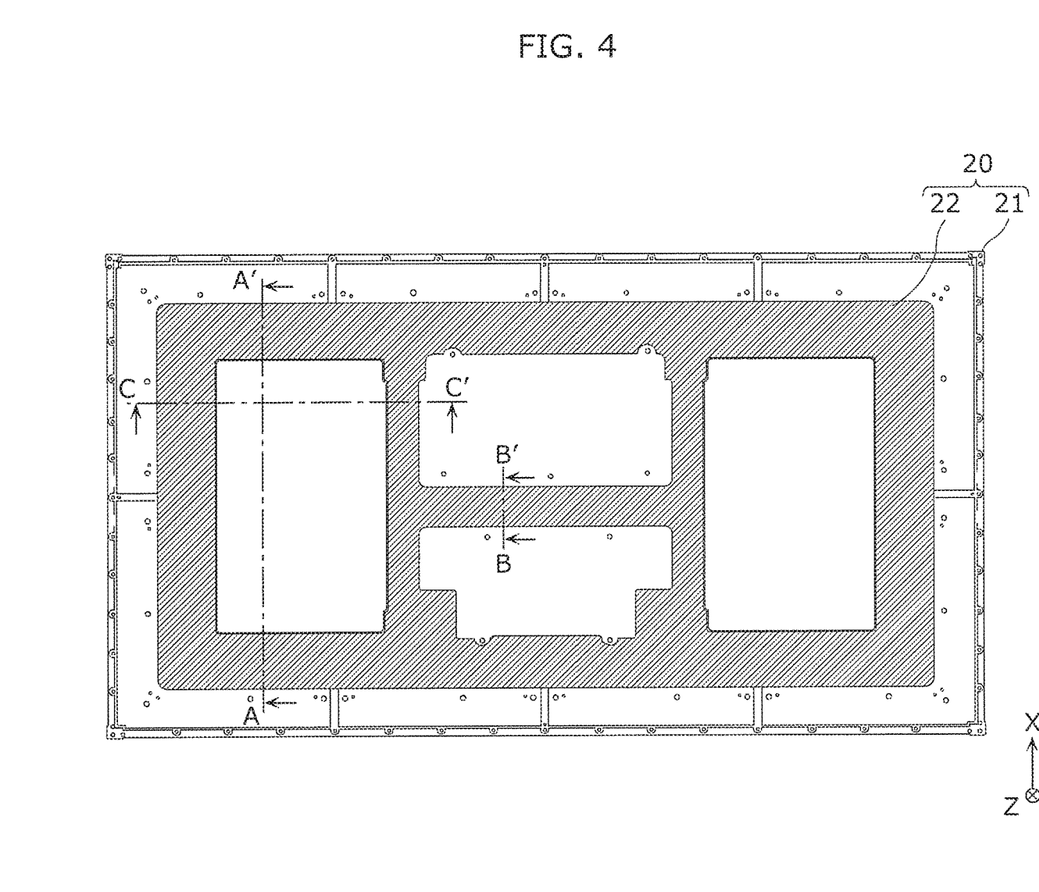
FIG. 4 is a plan view of the chassis structure according to Embodiment 1.
Figure 5:
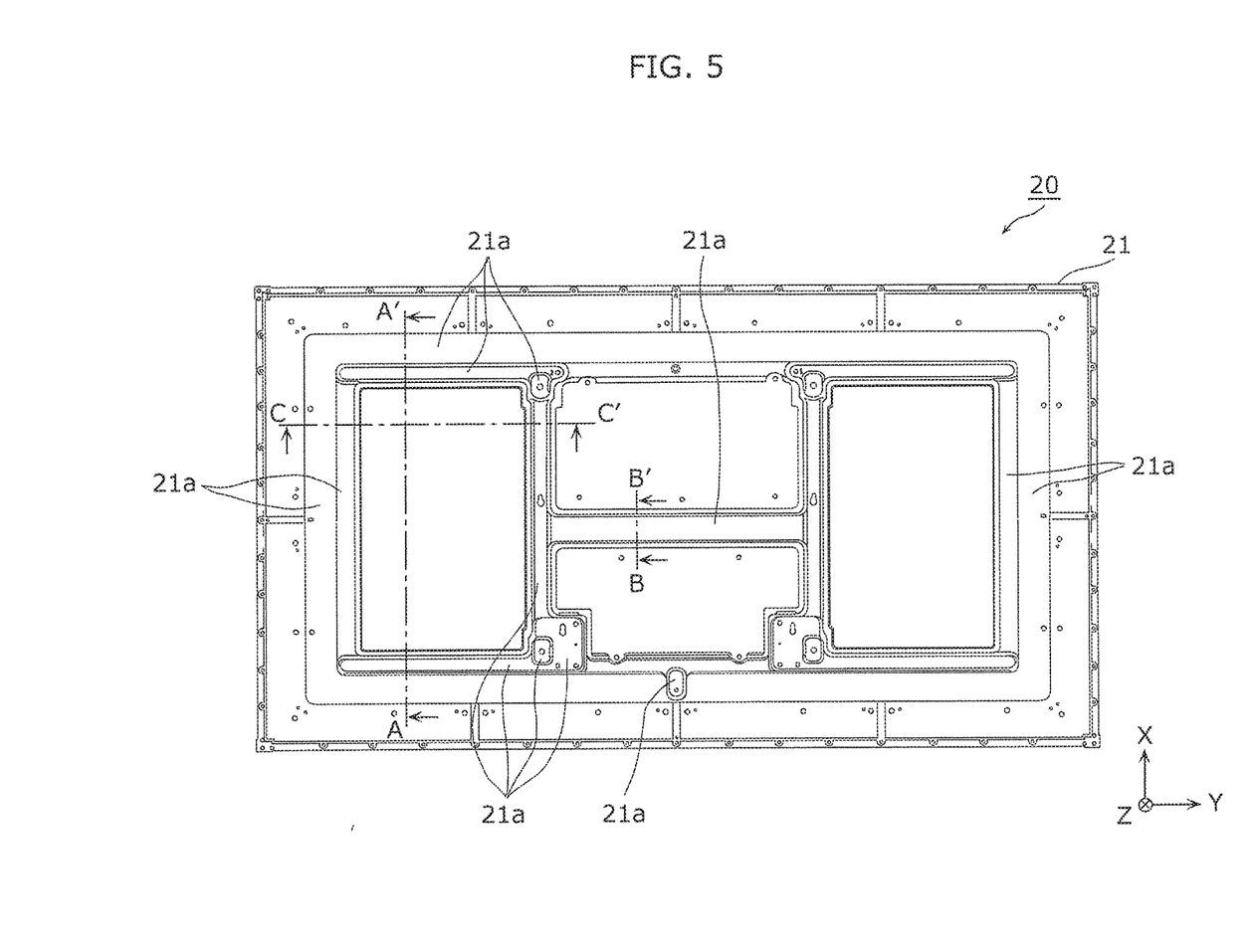
FIG. 5 is a plan view of the chassis structure shown in FIG. 4 when viewed through the second chassis member.
Figure 6:
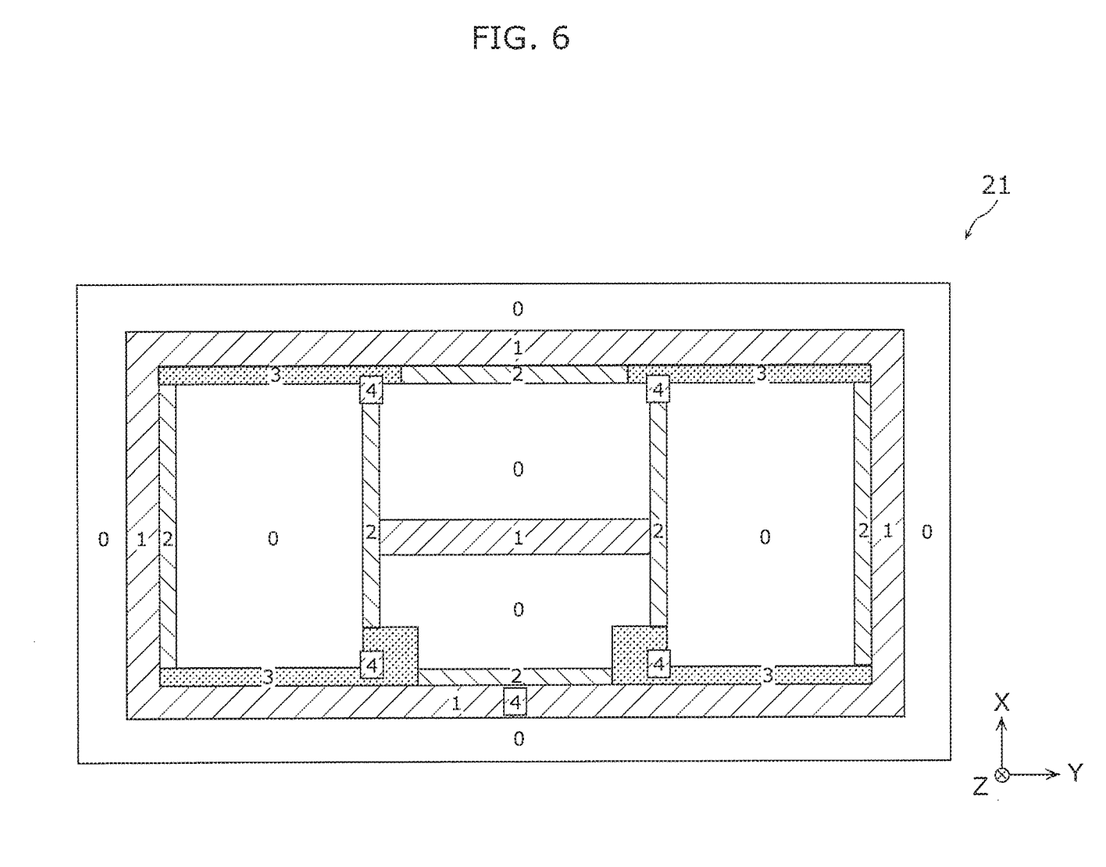
FIG. 6 is a plan view schematically illustrating step regions of the first chassis member according to Embodiment 1.

FIG. 4 is a plan view of the chassis structure 20 according to Embodiment 1. FIG. 5 is a plan view of the chassis structure 20 shown in FIG. 4 when viewed through the second chassis member 22. FIG. 6 is a plan view schematically illustrating step regions of the first chassis member 21 according to Embodiment 1.

Figure 7A:
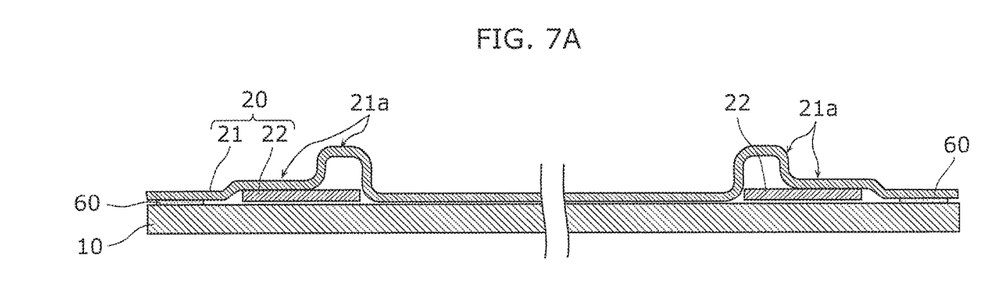
FIG. 7A shows a cross-sectional view of the chassis structure and a display panel taken along A-A' of FIGS. 4 and 5.
Figure 7B:
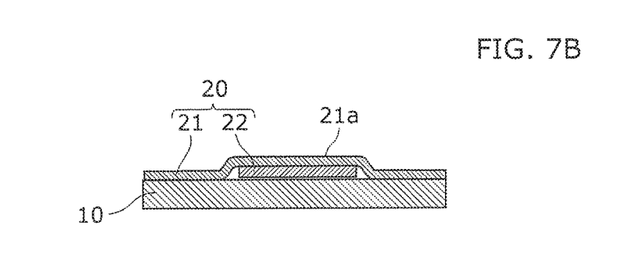
FIG. 7B shows a cross-sectional view of the chassis structure and the display panel taken along B-B' of FIGS. 4 and 5.
Figure 7C:
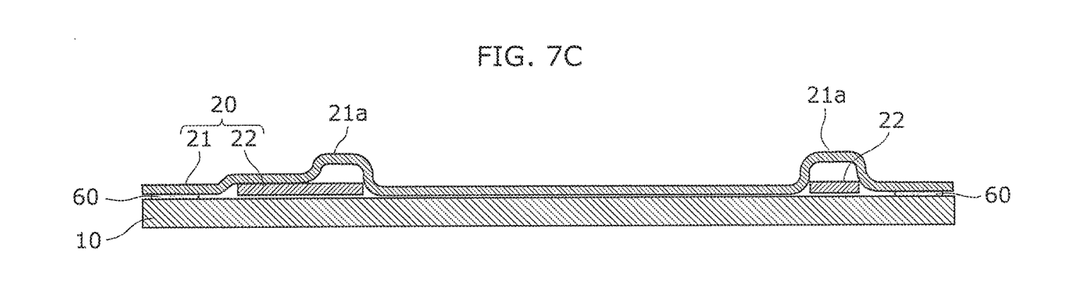
FIG. 7C shows a cross-sectional view of the chassis structure and the display panel taken along C-C' of FIGS. 4 and 5.

FIGS. 7A, 7B, and 7C are cross-sectional views of the chassis structure 20 and the display panel 10, respectively taken along A-A', B-B', and C-C of FIGS. 4 and 5.

As shown in FIGS. 5, and 7A through 7C, the first chassis member 21 is formed by the drawing process such that the recess 21a is formed of a plurality of steps. In other words, the drawing process is carried out on the first chassis member 21 to nave the recess 21a that has steps so that predetermined regions of the first chassis member 21 are raised (projected). In the present embodiment, the recess 21a (the draw) is formed by raising the surface of the rear cover 40 side (a surface opposite the display panel 10 side) of the first chassis member 21. Forming the recess 21a forms the steps. The depth (depth of the draw) of each step of the recess 21a may be 0.5 mm to 10 mm, for example.

In the present embodiment, as shown in FIG. 6, the recess 21a is a stepped recess formed by the drawing process carried out on the surface of the first chassis member 21 so that the recess is formed of four steps of different depths.

In FIG. 6, "0," "1," "2," "3," and "4" referring to the regions indicate different depth positions of the steps, where steps having the same depth are hatched in the same manner. Specifically, the regions "0" are reference surfaces on which no drawing process is carried out. The regions "0" are located closest to the display panel 10 among all the regions, and in contact with or connected to the display panel 10. The regions "1" are at a depth position deeper than the reference surfaces by one step. The regions "2" are at a depth position deeper than the reference surfaces by two steps. The regions "3" are at a depth position deeper than the reference surfaces by three steps. The regions "4" are at a depth position deeper than the reference surfaces by four steps.

While the drawing process is performed on the first chassis member 21 according to the present embodiment to have the recess 21a formed of the plurality of steps, it should be noted that the steps are formed in one opening. In other words, the recess 21a is formed whose opening is formed of steps of different depths.

As shown in FIGS. 4 and 5, the second chassis member 22 is in a shape covering only the opening of the recess 21a of the first chassis member 21. Specifically, the second chassis member 22 is formed so as to have openings (through holes) only at regions corresponding to the regions "0" of the first chassis member 21 in FIG. 6. The second chassis member 22 is a plate member made up of solid regions which correspond to the regions (i.e., the regions "1," "2," "3," and "4"), other than the regions "0," of the first chassis member 21 in FIG. 6.

By using, as the second chassis member 22, the plate member in which the openings are formed in this manner can reduce weight of the chassis structure 20, as compared to using a plate member which has no opening formed therein. This can prevent an increase in weight of the chassis structure 20 even if the second chassis member 22 is used. Thus, the chassis structure 20 which is thin, and has a desired strength and a reduced weight is obtained.

Moreover, as shown in FIGS. 7A through 7C, the second chassis member 22 is placed on steps at one of the four depths, among the plurality steps of the recess 21a of the first chassis member 21.

Placing the second chassis member 22 on the steps of the recess 21a of the first chassis member 21 in this manner can reduce the length of the chassis structure 20 in the depth direction, thereby achieving the thin chassis structure 20. For example, if the thickness of the second chassis member 22 is set shallower or equal to the depth of the steps on which the second chassis member 22 is placed, the length of the chassis structure 20 in the depth direction is equal to the length of the first chassis member 21 in the depth direction even when the second chassis member 22 is mounted on the first chassis member 21. In other words, the steps of the first chassis member 21 absorb the thickness of the second chassis member 22.

When joining the first chassis member 21 and the second chassis member 22 at several positions by staking, the second chassis member 22 may be misaligned due to variations in staked condition, ending up sticking out from the first chassis member 21. For this reason, the depth of the steps of the first chassis member 21 for placing the second chassis member 22 thereon may be determined, taking into account the thickness of the second chassis member 22 and variations in staking.

Here, since the chassis structure 20 also serves as a heat capacity member for absorbing and dissipating the heat generated by the display panel 10, desirably, such a standpoint as the above should be considered in determining the positional relationship between the first chassis member 21 and the second chassis member 22 or determining regions of the second chassis member 22 which cover the opening of the recess 21a.

In the present embodiment, the second chassis member 22 is placed on steps of the recess 21a that are located closest to the display panel 10, among the plurality of steps. In other words, the second chassis member 22 is placed on the first chassis member 21, in contact with the steps in the regions "1" in FIG. 6.

This can place the second chassis member 22 (the plate member) closer to the display panel 10, thereby approximating the surface of the display panel 10 side of the chassis structure 20 to a planar surface. Thus, the heat generated by the display panel 10 can efficiently be absorbed and dissipated by the chassis structure 20.

The second chassis member 22 is placed on the first chassis member 21, covering the entire opening of the recess 21a, as described above. Specifically, the second chassis member 22 is placed covering the regions (i.e., the regions "1," "2," "3," and "4") of the first chassis member 21, other than the regions "0" in FIG. 6.

This can approximate the entire surface of the display panel 10 side of the chassis structure 20 to a planar surface covering the entire display panel 10, thereby covering the entire rear surface of the display panel 10 with the planar surface of the display panel side of the chassis structure 20. As a result, the effects of the chassis structure 20 in extracting the heat generated by the display panel 10 is improved, thereby further improving the heat dissipation capability of the display panel 10.

As shown in FIGS. 7A through 7C, the second chassis member 22 is placed on the steps of the recess 21a of the first chassis member 21 so that the surface of the peripheral edge of the first chassis member 21 is flush with the surface of the second chassis member 22. Specifically, the second chassis member 22 is configured to have a thickness substantially equal to the depth of the steps in the regions "1" of the recess 21a of the first chassis member 21.

As an example, if the second chassis member 22 has a thickness of 0.6 mm, the depth (a depth of draw) of the steps in the regions "1" of the recess 21a in FIG. 6 is about 0.6 mm. It should be noted that in this case, the depths (depths of draw) of the steps in the regions "2," "3," and "4" of the recess 21a may be, for example, about 7 mm.

This can bring the entire surface of the display panel 10 side of the chassis structure 20 into a generally planar surface, thereby placing the display panel 10 and the chassis structure 20 as close to each other as the entire rear surface of the display panel 10 can be in contact with the entire surface of the display panel side of the chassis structure 20. In other words, the entirety of a surface (a contact surface) where the display panel 10 and the chassis structure 20 are facing each other can be made substantially a uniform, flat surface. Thus, the chassis structure 20 can uniformly absorb the heat that is generated by the display panel 10 from the entire rear side of the display panel 10. This can further increase the thermal uniformity of the display panel 10.

As shown in FIGS. 7A through 7C, the display panel 10 and the chassis structure 20 are adhered to each other by an adhesive member 60 which is, for example, a double-sided tape or double-sided adhesive sheet. In the present embodiment, as the adhesive member 60, a double-sided tape having a thickness of 0.03 mm is applied between the periphery of the rear surface of the display panel 10 and the periphery of the first chassis member 21.

From the foregoing, according to the display apparatus 1 of the present embodiment, the chassis structure 20 is used which is configured to cover the recess 21a of the first chassis member 21 with the second chassis member 22 that is in the plate shape.

This allows the first chassis member 21 to be reinforced by the second chassis member 22, thereby achieving the chassis structure 20 that, even in the case where it, is a thin structure including the thin first chassis member 21, has a strength required to hold the display panel 10. As a result, desired rigidity of the display panel 10 is provided, achieving a thin display apparatus that has excellent rigidity.

Furthermore, since the recess 21a is covered with the second chassis member 22 which is the plate member, the surface of the display panel 10 side of the chassis structure 20 can be brought into a generally planar surface.

This allows the heat generated by the display panel 10 to be efficiently absorbed into the chassis structure 20, thereby improving the heat dissipation capability of the display panel 10.

In this manner, the display apparatus 1 according to the present embodiment increases the heat: dissipation capability of the display panel 10, while providing desired rigidity of the display panel 10.

While the present embodiment has been described with reference to the second chassis member 22 in the plate shape having the structure of covering the entire opening of the recess 21a of the first chassis member 21, the present disclosure is not limited to this structure. A portion of the opening of the recess 21a which is covered with the second chassis member 22 may be determined to balance the requisite strength.

While the present embodiment has been described with reference to one recess 21a, the present disclosure is not limited to this structure. The plural recesses 21a may be formed in the first chassis member 21. In this case, the second chassis member 22 may, although it can cover all the openings of the plurality of recesses 21a, cover at least one of the openings of the plurality of recesses 21a to balance the requisite strength. In this case also, a portion of each of the openings of the recesses 21a which is covered with the second chassis member 22 may be determined to balance the requisite strength as described above. The regions may be the same or different depending on an opening of the recess 21a. To cover the openings of the plurality of recesses 21a, the second chassis member 22 may be plural.

Embodiment 2

Figure 8:
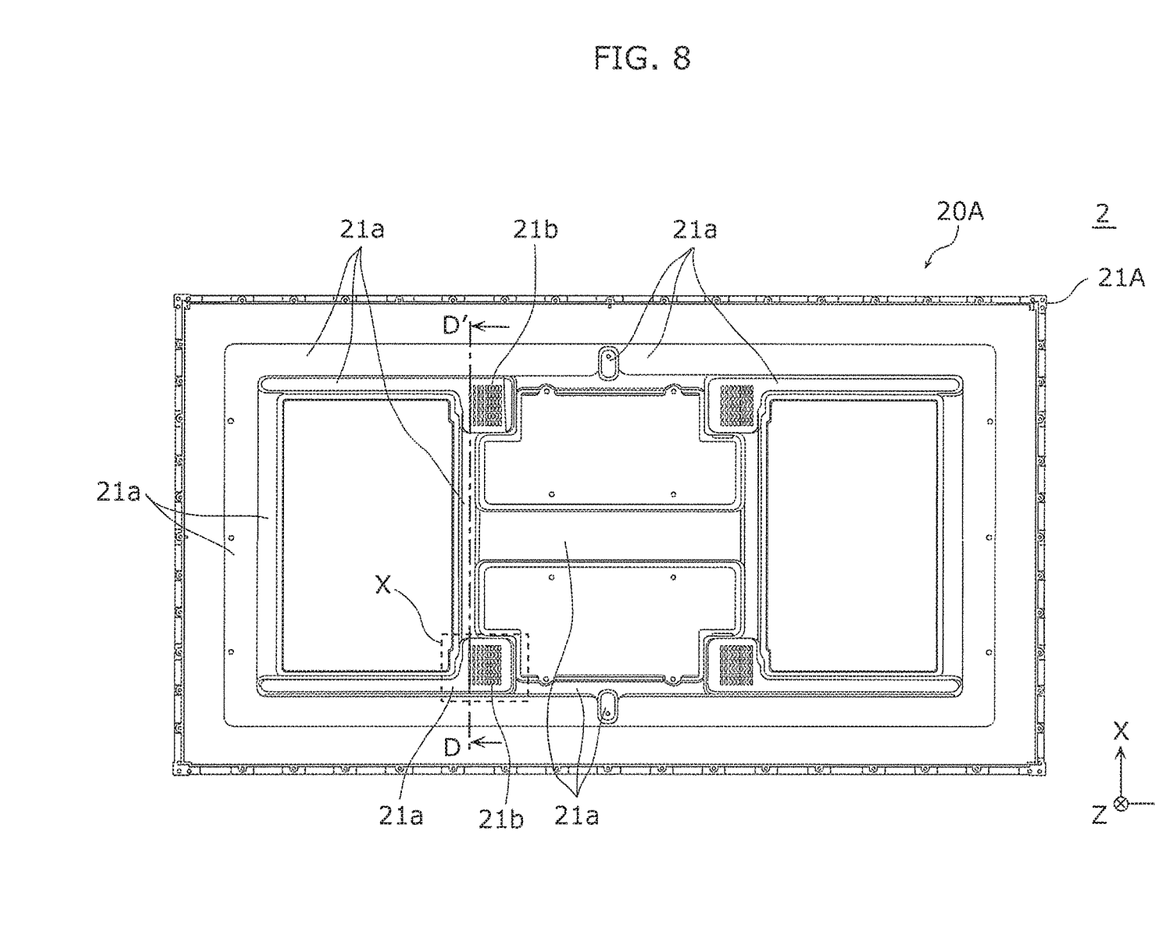
FIG. 8 is a plan view of a configuration of a first chassis member included in a display apparatus according to Embodiment 2.
Figure 9:
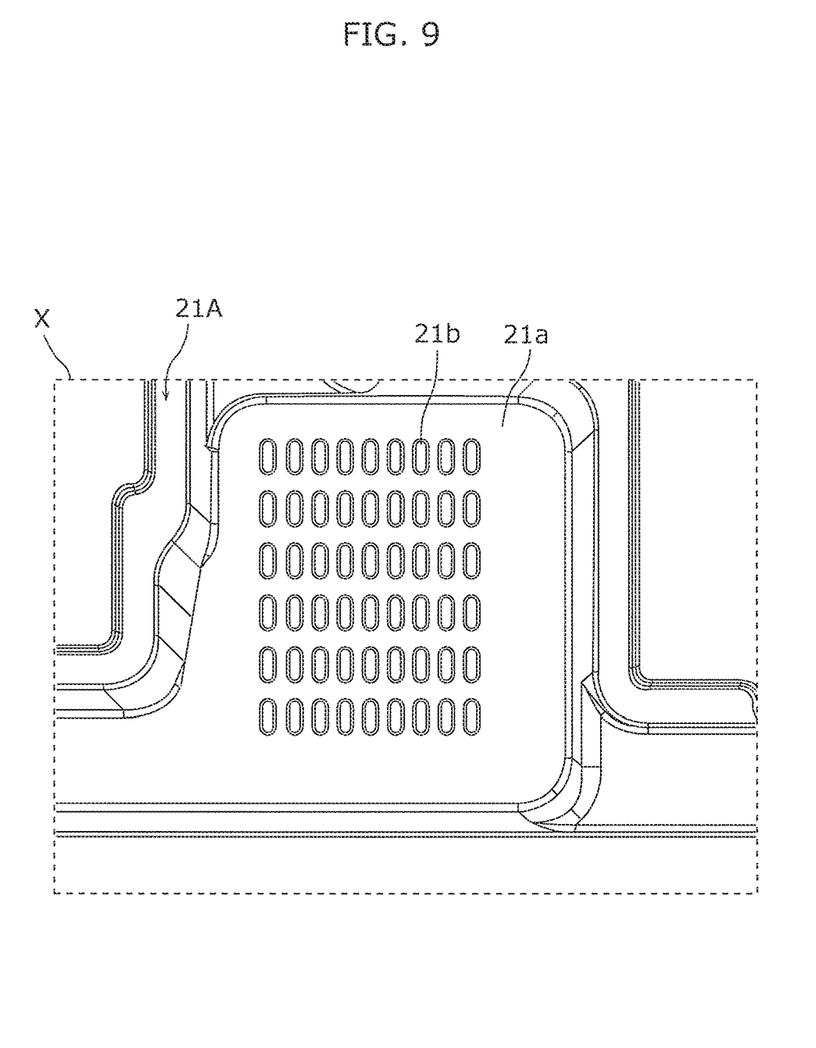
FIG. 9 is a magnified view of a region X enclosed by a dashed line shown in FIG. 8.
Figure 10:
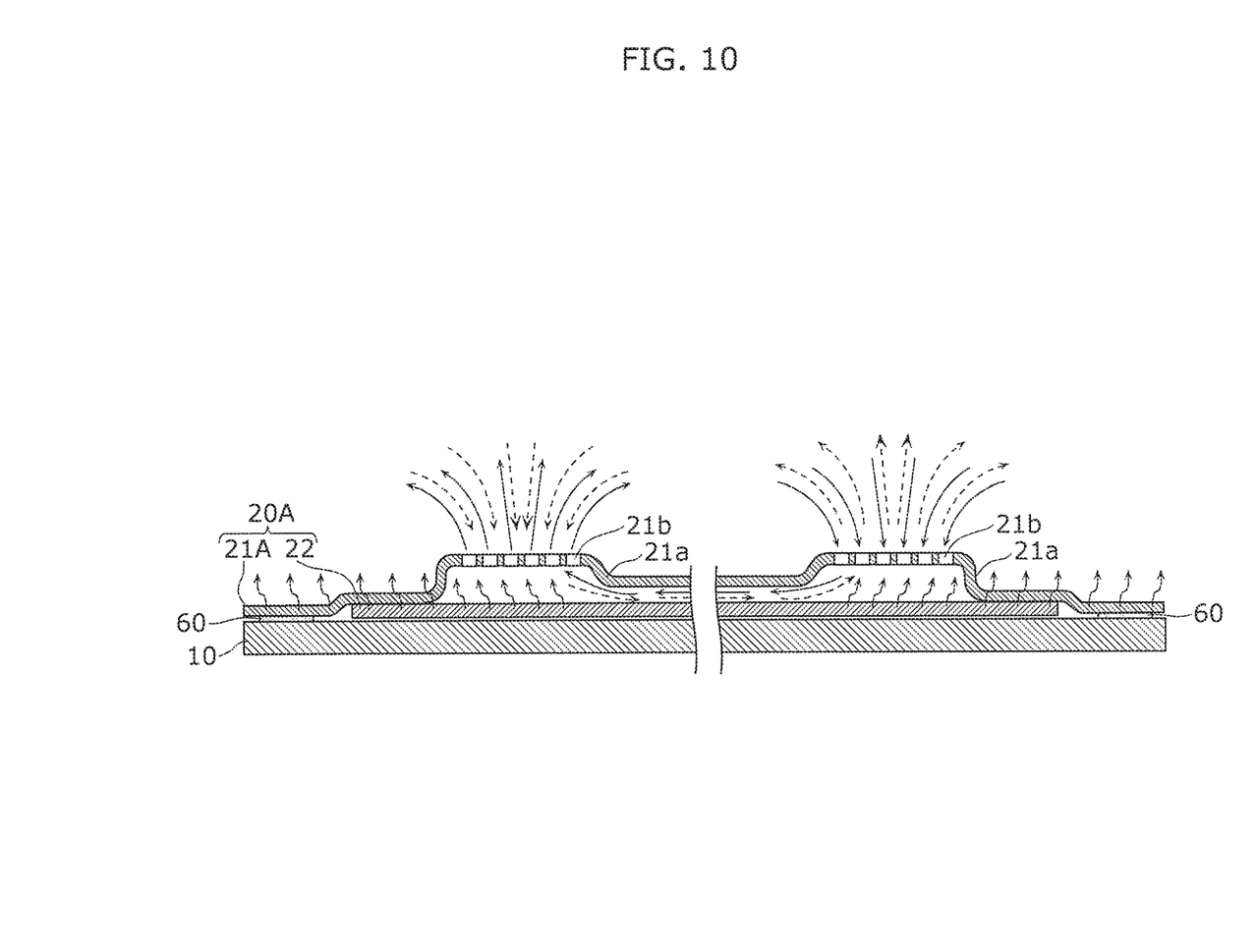
FIG. 10 is a cross-sectional view of the chassis structure and the display panel taken along D-D' of FIG. 8.

Next, a display apparatus 2 according to Embodiment 2 is described with reference to FIGS. 8 through 10. FIG. 8 is a plan view of a configuration of a first chassis member 21A included in the display apparatus 2 according to Embodiment 2. FIG. 9 is a magnified view of a region X enclosed by a dashed line shown in FIG. 8. FIG. 10 is a cross-sectional view of a chassis structure 20A and a display panel 10 taken along D-D' of FIG. 8.

As shown in FIGS. 8 and 9, in the display apparatus 2 according to the present embodiment, the bottom of a recess 21a of the first chassis member 21A included in the chassis structure 20A has a plurality of through holes (openings) 21b.

The first chassis member 21A according to the present embodiment is configured in the same manner as the first chassis member 21 according to Embodiment 1 described above, except for the through holes 21b. In the present embodiment, the second chassis member 22 according to Embodiment 1 described above is used, and, as with Embodiment 1 described above, the second chassis member 22 is mounted on the first chassis member 21A, covering the opening of the recess 21a of the first chassis member 21A.

The through holes 21b of the first chassis member 21A may not be formed across the bottom of the recess 21a, but may be formed in regions of the bottom of the recess 21a where the through holes 21b are needed. In the present embodiment, the through holes 21b are formed in steps in four regions "3" among the steps of the recess 21a. At each of the four regions, the through holes 21b are formed in a matrix.

As shown in FIG. 10, the through holes 21b are in communication with one another through a spatial region, of the recess 21a, enclosed by the first chassis member 21A and the second chassis member 22. In the present embodiment, the through holes 21b are all in communication spatially with one another through one spatial region in the recess 21a.

As described above, according to the display apparatus 2 of the present embodiment, the same advantageous effects as the display apparatus 1 according to Embodiment 1 are obtained. In other words, the display apparatus 2 of the present embodiment provides desired rigidity of the display panel 10 even in the case where the chassis structure 20A is formed thin. Thus, a thin display apparatus having excellent rigidity is achieved. In addition, the heat dissipation capability of the display panel 10 can be improved as well.

Moreover, according to the display apparatus 2 of the present embodiment, since the through holes 21b are formed in the bottom of the recess 21a of the first chassis member 21A, the heat dissipation capability of the chassis structure 20A can further be improved.

In other words, as with Embodiment 1, in the chassis structure 20 configured to cover the recess 21a of the first chassis member 21 with the second chassis member 22 in the plate shape, desirably, heat generated from the display panel 10 is transferred to the chassis structure 20 and then quickly dissipated. However, due to the presence of the spatial region in the recess 21a enclosed by the first chassis member 21 and the second chassis member 22, the interior of the spatial region is in a hermetically sealed state and ventilation is restricted. As a result, the heat conveyed to the chassis structure 20 is not dissipated efficiently, and thus the thermal uniformity of the display panel 10 may degrade.

In contrast, according to the first chassis member 21A of the present embodiment, despite of the chassis structure 20A configured such that the recess 21a of the first chassis member 21A is covered with the second chassis member 22, the through holes 21b are formed in the bottom of the recess 21a, and therefore a spatial region in the recess 21a enclosed by the first chassis member 21A and the second chassis member 22 is ventilated through the through holes 21b, as shown in FIG. 10, owing to what is known as chimney effect.

This can efficiently dissipate the heat conveyed from the display panel 10 to the chassis structure 20A, thereby suppressing the degradation of the thermal uniformity of the display panel 10.

Forming the through holes 21b in the first chassis member 21A can reduce the weight of the first chassis member 21A as well. This allows the chassis structure 20A that is lightweight and thin and has a desired strength to be obtained.

It should be noted that the display apparatus can be installed in various forms such as a horizontal position or vertical position. Thus, the through holes 21b may be formed as appropriate such that the ventilation owing to the chimney effect can be efficiently carried out no matter how the display apparatus is installed.

Alternatively, the through holes 21b can be formed in the side surfaces of the recess 21a (side surfaces of the steps). In the thin display apparatus 2, however, the depth of the first chassis member 21A cannot be increased by the drawing process. Thus, it is difficult to provide a large area of the side surface (the side of the step) of the recess 21a. For this reason, forming the through holes 21b imposes many restrictions in terms of shape and size, for example. The through holes 21b may better be formed in the bottom of the recess 21a, rather than in the side of the recess 21a.

Variations

While one aspect of the display apparatus has been described with reference to Embodiments 1 and 2, the present disclosure is not limited to these embodiments.

Figure 11:
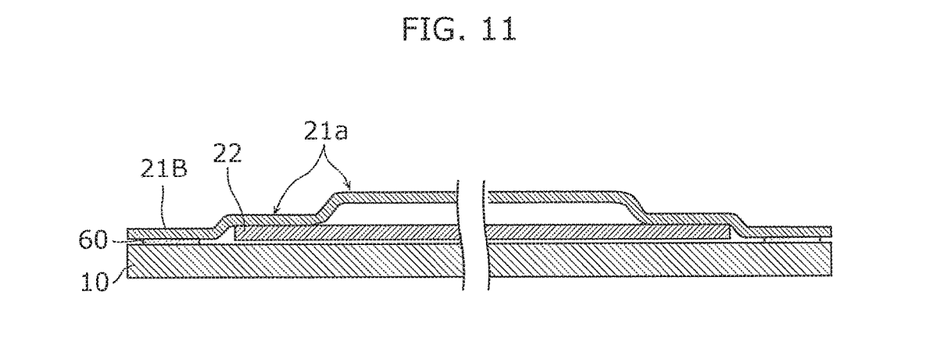
FIG. 11 shows cross-sectional views of the chassis structure and the display panel included in a display apparatus according to Variation 1.

For example, while in the above embodiments, the drawing process is applied to the first chassis member 21 and 21A to form the recess 21a formed of four steps, the present disclosure is not limited to this structure. The display apparatus according to the present disclosure may include a first chassis member 21B which has the recess 21a formed of two steps, as shown in FIG. 11.

Figure 12:
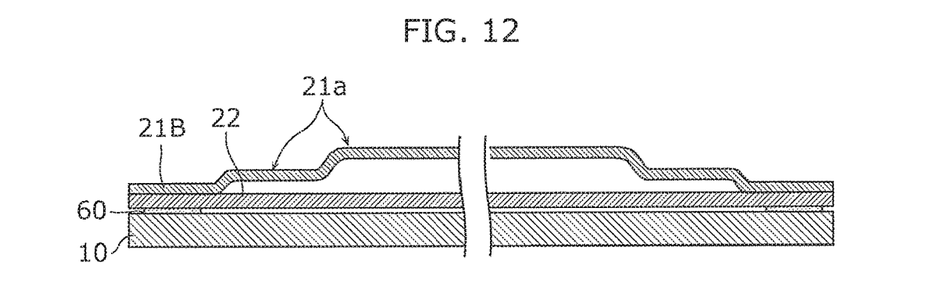
FIG. 12 shows cross-sectional views of the chassis structure and the display panel included in a display apparatus according to Variation 2.

While in the above embodiments, the second chassis member 22 is placed on the steps of the first chassis member 21 and 21A, the present disclosure is not limited to this structure. For example, as shown in FIG. 12, the second chassis member 22 may be placed on a portion of the first chassis member 21B, the portion having no step formed. In this case, the adhesive member 60 is disposed between the periphery of the display panel 10 and the periphery of the second chassis member 22.

Figure 13:
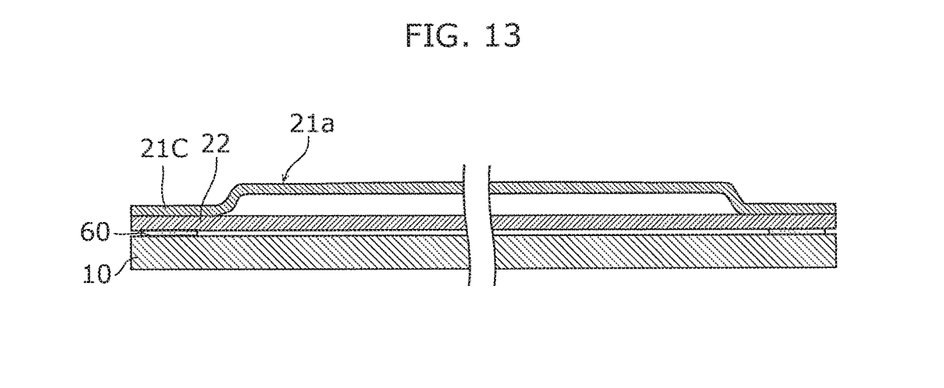
FIG. 13 shows cross-sectional views of the chassis structure and the display panel included in a display apparatus according to Variation 3.

While in the above embodiments, the drawing process is carried out on the first chassis member 21 and 21A to form the recess 21a that is formed of a plurality of steps, the present disclosure is not limited to this structure. For example, the display apparatus according to the present disclosure may include a first chassis member 21C which has the recess 21a formed of one step, as shown in FIG. 13.

While in the above embodiments, the display apparatus has been described with reference to a television transceiver, the present disclosure is not limited thereto. For example, the display apparatus may be a monitor display which displays a video input externally, a digital signage used as an advertising medium, or a mobile terminal, tablet, or table-type display apparatus which receives user operation by a touch panel, for example.

In other instances, various modifications to the embodiments and variations thereof according to the present: disclosure described above that may be conceived by those skilled in the art and embodiments implemented by any combination of the components and functions shown in the embodiments and variations thereof are also included within the scope of the present disclosure, without departing from the spirit of the present disclosure.

INDUSTRIAL APPLICABILITY

The present disclosure is useful for, for example, display apparatuses for which the reduction in thickness thereof is demanded, and is applicable to electronic devices such as television transceivers, monitor displays, digital signage, mobile terminals, tablets and table-type display apparatuses, for example.

REFERENCE SIGNS LIST 1, 2 display apparatus
10 display panel
20, 20A chassis structure
21, 21A, 21B, 21C first chassis member
21a recess
21b through hole
22 second chassis member
30 frame
40 rear cover
50 circuit board
60 adhesive member

The invention claimed is:

1. A display apparatus, comprising:
a display panel;
a chassis structure which holds the display panel; and
a rear cover which covers the chassis structure, wherein
the chassis structure includes a first chassis member in which a recess includes an opening which opens toward a display panel side, and a second chassis member having a plate shape, and mounted on the first chassis member, covering at least a portion of the opening of the recess, and
the second chassis member includes openings corresponding to regions of the first chassis member which are not recessed.

2. The display apparatus according to claim 1, wherein
the first chassis member has a plurality of recesses including openings which open toward the display panel side, and
the second chassis member covers at least one of the openings of the plurality of recesses.

3. The display apparatus according to claim 1, wherein
the second chassis member covers an entirety of the opening of the recess.

4. The display apparatus according to claim 1, wherein
the first chassis member is formed to have the recess by carrying out press working on a plate.

5. The display apparatus according to claim 4, wherein
the press working is a drawing process.

6. The display apparatus according to claim 1, wherein
the recess includes plural steps, and
the second chassis member is disposed on one of the plural steps.

7. The display apparatus according to claim 6, wherein
the second chassis member is disposed on a step located closest to the display panel, among the plural steps.

8. The display apparatus according to claim 6, wherein
the second chassis member is disposed on the plural steps in a manner that a surface of the second chassis member is flush with a surface of a peripheral edge of the first chassis member.

9. The display apparatus according to claim 1, wherein a plurality of through holes is formed in a bottom of the recess.

10. The display apparatus according to claim 9, wherein each of the plurality of through holes is in communication through a spatial region in the recess.

11. The display apparatus according to claim 1, wherein an adhesive member is disposed between a periphery of the display panel and a periphery of the first chassis member.

12. The display apparatus according to claim 1, wherein the rear cover covers an entirety of the chassis structure when viewed in a direction toward the display panel side.

13. The display apparatus according to claim 1, wherein a depth of the chassis structure in the direction toward the display panel side is equal to a depth of the first chassis member in the direction toward the display panel side.

14. The display apparatus according to claim 13, wherein the second chassis member is within the recess of the first chassis member for absorbing a depth of the second chassis member in the direction toward the display panel side by the first chassis member.

15. The display apparatus according to claim 14, wherein the second chassis member is on a step within the recess.

\* \* \* \* \*